United States Patent
Causse et al.

(10) Patent No.: US 11,143,788 B2
(45) Date of Patent: Oct. 12, 2021

(54) EFFICIENT SOLUTIONS OF INVERSE PROBLEMS

(71) Applicant: STATOIL PETROLEUM AS, Stavanger (NO)

(72) Inventors: Emmanuel Causse, Trondheim (NO); Anh Kiet Nguyen, Trondheim (NO); Janniche Iren Nordskag, Buvika (NO); Frank Agnar Maaø, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 331 days.

(21) Appl. No.: 15/572,444

(22) PCT Filed: May 8, 2015

(86) PCT No.: PCT/EP2015/060267
§ 371 (c)(1),
(2) Date: Nov. 7, 2017

(87) PCT Pub. No.: WO2016/180458
PCT Pub. Date: Nov. 17, 2016

(65) Prior Publication Data
US 2018/0136365 A1    May 17, 2018

(51) Int. Cl.
*G01V 99/00* (2009.01)
*G01V 3/08* (2006.01)
(Continued)

(52) U.S. Cl.
CPC .......... *G01V 99/005* (2013.01); *G01V 3/083* (2013.01); *G06F 17/16* (2013.01); *G01V 3/165* (2013.01);
(Continued)

(58) Field of Classification Search
CPC ............ G01V 2003/086; G01V 3/083; G01V 99/005; G01V 3/165; G06F 17/16;
(Continued)

(56) References Cited

U.S. PATENT DOCUMENTS 7,095,678 B2 * 8/2006 Winbow ................ G01V 99/00 367/73
8,612,194 B2 * 12/2013 Horne .................... G01V 3/083 702/7

(Continued)

FOREIGN PATENT DOCUMENTS

WO    WO 2014/000758 A1    1/2014

OTHER PUBLICATIONS

Afanasiev, Michael, et al. "Automatic Global Multiscale Seismic Inversion: Insights into Model, Data, and Workflow Management." Proceedings of the Platform for Advanced Scientific Computing Conference. 2016.*

(Continued)

*Primary Examiner* — Rehana Perveen
*Assistant Examiner* — Steven W Crabb
(74) *Attorney, Agent, or Firm* — Birch, Stewart, Kolasch & Birch, LLP (57) ABSTRACT

A method of solving a geophysical inverse problem for estimating a physical parameter, the method comprising providing a model vector representing the physical parameter, transforming the model vector by a first operator to provide a first transformed model vector, solve the inverse problem for the first transformed model vector to provide a first solution, transforming the model vector by a second operator to produce a second transformed model vector, solve the inverse problem for the second transformed model vector to provide a second solution, calculating a weighted sum of the first solution and the second solution.

18 Claims, 5 Drawing Sheets

(51) Int. Cl.
*G06F 17/16* (2006.01)
*G06F 111/10* (2020.01)
*G01V 3/165* (2006.01)

(52) U.S. Cl.
CPC ..... *G01V 2003/086* (2013.01); *G06F 2111/10* (2020.01)

(58) Field of Classification Search
CPC ............. G06F 2217/16; G06F 2111/10; B01D 2252/102; B01D 2252/103; B01D 53/1412; B01D 53/1481; B01D 53/1493; B01D 53/346; B01D 53/50; Y02A 50/2346
See application file for complete search history.

(56) References Cited

U.S. PATENT DOCUMENTS

| | | | |
|---|---|---|---|
| 2009/0120634 A1 | 5/2009 | Liu et al. | |
| 2009/0204327 A1 | 8/2009 | Lu et al. | |
| 2009/0306900 A1* | 12/2009 | Jing | G01V 3/12 702/13 |
| 2010/0332198 A1* | 12/2010 | Wahrmund | G01V 3/12 703/2 |
| 2011/0313737 A1 | 12/2011 | Hadj-Sassi et al. | |
| 2014/0058677 A1 | 2/2014 | Combee | |
| 2015/0123835 A1* | 5/2015 | Sokolowsky | G01V 3/38 342/22 |
| 2016/0349389 A1* | 12/2016 | Walters | G01V 1/50 |

OTHER PUBLICATIONS

International Search Report for PCT/EP2015/060267 (PCT/ISA/210) dated Feb. 1, 2016.
Written Opinion of the International Searching Authority for PCT/EP2015/060267 (PCT/ISA/237) dated Feb. 1, 2016.
Vesnaver et al., "Staggered or adapted grids for seismic tomography?," The Leading Edge, Sep. 2000, 4 pages total.

* cited by examiner

EFFICIENT SOLUTIONS OF INVERSE PROBLEMS

The present invention relates to linear and non-linear inversion of physical data and more specifically but not limited to controlled-source electromagnetic (CSEM) data or acoustic data.

A number of techniques for exploring the Earth's subsurface have been developed that are based on transmitting waves or signals into a region of the Earth's subsurface. The transmitted signal interacts with the earth and typically a portion of the signal propagates back to the surface where it is recorded and used to obtain information about the subsurface structure, based on how the signal has interacted with the earth. The CSEM method uses, for example, a dipole source which is towed above the seafloor for transmitting an electromagnetic signal and an array of receivers placed on the seabed for detecting the signal which has travelled through the formation below the seafloor. The detected signal then needs to be inverted for deriving physical parameters. The physical parameters could optionally be used for estimating the presence of hydrocarbons or water. An example of a physical parameter which could be derived is conductivity of the formation. The conductivity can be used as a parameter in a simulation, whereby the simulation is capable of simulating the recorded data. The optimal values for the conductivities are those which optimise the agreement between the simulation of the recorded data and the data.

Non-linear inversion of CSEM data involves solving a large linear system of equations to calculate updates of the conductivity at each iteration of an iterative optimisation method in order to minimise the distance between the data and the simulated data. The number of nodes of a spatial three dimensional grid on which a model vector is based typically exceeds a million, and solving the normal equations on that grid becomes unfeasible. Optimization algorithms like the limited-memory Broyden-Fletcher-Goldfarb-Shanno algorithm can be used, but they require very accurate start model vectors to deliver good inversion results. Reducing the number of inversion parameters, also called free parameters, is an important way of increasing the efficiency of the inversion algorithm.

Strong geometrical constraints may be used to reduce the number of independent free parameters. For example, the conductivity values in geologically defined bodies can be set to constant values and those constant values are then inverted. However, a disadvantage of such methods is that they require much a priori information and are not suitable when resistive or conductive bodies stretch across the defined geometrical structures.

STATEMENT OF INVENTION

According to a first aspect of the invention, there is provided a method of solving a geophysical inverse problem for estimating a physical parameter, the method comprising: providing a model vector representing the physical parameter, transforming the model vector by a first operator to provide a first transformed model vector, solve the inverse problem for the first transformed model vector to provide a first solution, transforming the model vector by a second operator to produce a second transformed model vector, solve the inverse problem for the second transformed model vector to provide a second solution and calculating a weighted sum of the first solution and the second solution. Calculating the weighted sum of the first solution and the second solution may provide an estimation of the physical parameter.

The weighted sum of the first solution and the second solution may minimise the distance between a set of measurements and a simulation of the set of measurements, wherein the simulation is dependent on the model vector. Transforming the model vector by a first operator may comprise reducing the number of free parameters in the inverse problem according to a first compression factor and wherein transforming the model vector by a second operator comprises reducing the number of free parameters according to a second compression factor. Alternatively, transforming the model vector by a first operator may comprise applying a first Fourier transform to the model vector and wherein transforming the model vector by a second operator comprises applying a second Fourier transform to the model vector, whereby a filter may be used to select a portion of the Fourier spectrum.

Reducing the number of free parameters in the inverse problem may comprise interpolating the model vector defined on a fine grid to provide the first transformed model vector defined on a first coarse grid, wherein the resolution of the first coarse grid is lower than the resolution of the fine grid, and interpolating the model vector defined on a fine grid to provide the second transformed model vector defined on a second coarse grid, wherein the resolution of the second coarse grid is lower than the resolution of the fine grid. The coarse grid may be uniform or non-uniform and the coarse grid may depend on prior knowledge of the physical structure of a formation. The first coarse grid is shifted with respect to the second coarse grid.

The set of measurements may be one of: a set of seismic, electric, magnetic or gravimetric measurements. The model vector comprises a model update in an iterative inversion method and the minimal distance may be estimated with a line search. The inversion problem may be a linear or a non-linear inversion problem.

According to a second aspect of the invention, there is provided a computer system arranged to carry out the method according to the first aspect of the invention.

According to a third aspect of the invention, there is provided computer software which, when installed on the computer system according to the second aspect of the invention, is arranged to cause the computer system to carry out the method according to the first aspect of the invention.

FIGURES

Some embodiments of the invention will now be described by way of example only and with reference to the accompanying drawings, in which.

SPECIFIC DESCRIPTION

Figure 1:
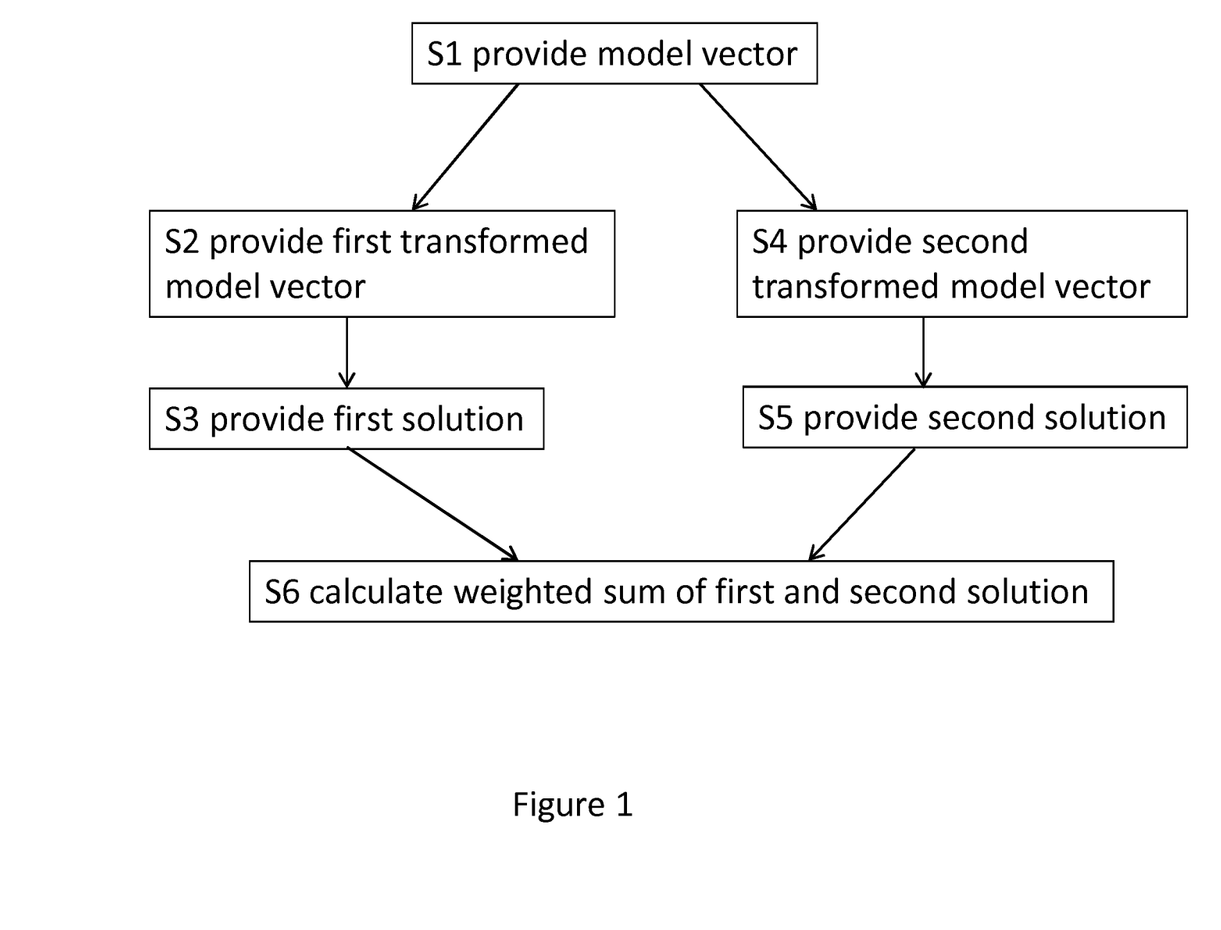
FIG. 1 is a flow diagram illustrating the method disclosed herein.

As illustrated in FIG. 1, the present method solves a geophysical inverse problem for estimating a physical parameter, by providing a model vector (S1) representing the physical parameter, transforming the model vector by a first operator to provide a first transformed model vector (S2), solve the inverse problem for the first transformed model vector to provide a first solution (S3). The model then transforms the model vector by a second operator to produce a second transformed model vector (S4) and solves the inverse problem for the second transformed model vector to provide a second solution (S5). The method finally calculates a weighted sum of the first solution and the second solution (S6), which provides an estimation of the physical parameter. Although the example of two solutions is given, the method uses a combination of many solutions in most applications.

The transformation may be a Fourier transformation, whereby a filter is applied to the transformed model vector to filter out some frequency components. Alternatively, the transformation may be a reduction in the number of free parameters in the model vector to reduce the size of the problem. The transformation may also be a principle component analysis wherein some of the less important components are excluded.

An example of the present method concerns solving geophysical inverse problems in which an N-dimensional vector of model parameters is directly calculated (linear inversion) or is iteratively updated (non-linear inversion), using an optimisation strategy. The method comprises reducing the vector of model parameters on a grid which has a reduced dimension when compared to the grid on which the vector of model parameters is defined. Solving the reduced model vector is less complicated than solving the full model vector. The step of reducing is repeated using a second grid which is shifted with respect to the first grid and the problem is solved again on the second grid. The first solution is combined with the second solution to provide a combined solution which has a resolution which is higher than the first solution or the second solution.

The grid may be an array of cells, whereby the model vectors or the solutions are constant within each cell. For example, the cells in real space can be three dimensional sections of a formation and a physical value such as the resistivity could be chosen constant within those cells.

In most geophysical inverse problems, one or more systems of equations of the following form have to be solved one or several times in the inversion process (equation 1):

$$(F^*C_d^{-1}F+\lambda Q)m = F^*C_d^{-1}d + \lambda_g Q_g \Delta m.$$

The quantities in this equation have the following meaning:

The symbol m is a vector representing the unknown parameters to be estimated. These parameters are often called model parameters and m model vector because in many inverse problems estimating these parameters allow to construct a 3D model of certain properties of the earth's subsurface (e.g. mechanical, electrical or magnetic properties.). Example of such properties are the electric resistivity, the velocity of compressional or shear waves, the acoustic impedance, the density and the magnetic susceptibility. Alternatively, m represents a possible update of an initial model vector or of a previous approximation of the solution of the system of equations (1). The size of m is (N,1), where N is the number of parameters.

The symbol d represents a column vector containing measured data, or containing the difference between measured data and simulated data. These data can be of different type: seismic, electric, magnetic, gravimetric, etc. . . . . The size of d is ($N_d$, 1), where $N_d$ is the number of data measurements. $C_d$ is normally the covariance matrix of the data uncertainties or an approximation of it, diagonal or not. $C_d^{-1}$ is the inverse of $C_d$ or an approximation of it, diagonal or not.

The symbol F is a linear modeling operator of size ($N_d$,N). In the case of linear inverse problems F represents the forward operator (also called modeling operator), so that F multiplied by a given model vector represents simulated data corresponding to this particular model vector. Alternatively, in the case of non-linear inverse problems, F represents a linear approximation of the non-linear forward/modeling operator F. In that case F is often called Jacobian.

The asterisk * represents the conjugate transpose, or simply the transpose when only real quantities are involved.

The symbols Q and $Q_p$ are matrices introduced to stabilize the numerical inverse problem, or to regularize it (i.e. to favour certain types of solutions in the case when many different model vectors can give similar simulated data). Typical choices for Q are Q=I (for instance in the Levenberg Marquardt algorithm), where I is the identity matrix, Q=S*S, where S is a first- or second-order derivative operator (e.g. Occam algorithm and certain types of Tickhonov regularizations), $Q=C_m^{-1} \cdot Q_g$ is often equal to Q but can take other values as well.

The symbol $\lambda$ is a scalar parameter that steers the amount of stabilization or regularization. $\lambda_g$ is also a scalar parameter, normally equal to $\lambda$ but that can also take different values, e.g. the value zero. These parameters can be fixed, or can vary during the iterative process when several iterations are run, or they can also be estimated by an optimization process (e.g. Levenberg-Marquardt and OCCAM algorithms)

The symbol $\Delta m$ is normally zero when a single iteration is used to estimate p. When several iterations are used, it typically represents the parameter vector estimated at a previous iteration, or the difference between the parameter vector estimated at a previous iteration and an a priori parameter vector.

In iterative algorithms a previous estimate of the model vector can be refined by adding to this estimate the model update vector m obtained by solving the system of equations (1). Alternatively, one may add $\alpha m$ to this previous estimate of the model vector, where the scalar parameter $\alpha$ can be optimised by different techniques. Examples of different techniques are so called line-search techniques, where one tries to find an optimal value of $\alpha$ to further reduce the distance between the data and the simulated data. With the Gauss-Newton algorithm, for instance, one could use a line-search procedure. Line-search requires some simulations and one could use internal "line search iterations" in addition to the more global iterative process. For linear inversion, line search is not necessary because the optimal value for alpha is 1 and there is no need to search for it. In case of non-linear inversion, m would be interpreted as the "search direction" and $\alpha m$ would be interpreted as the "model update". The notation has been chosen to cover both linear and non-linear inversions.

In certain situations, parts of the quantities just defined above are replaced by quantities that are simpler to calculate. For instance an approximation of the effect of the matrix on the left-hand side of (1) can be approximately built up during an iterative process, without the need to calculate the matrix or to invert it (e.g. conjugate gradient, BFGS and LBFGS algorithms).

One common point to all algorithms where a system of equations similar to (1) has to be solved is that when the dimension of the model vector increases significantly, the system may become impossible to solve in practice: the matrices involved can be too large to be stored in a computer memory, or the number of numerical operations can become too large. This can for example be the case when large 3 dimensional geographical data sets have to be inverted.

For that reason, model compression techniques have been developed. The large model vector m is replaced by a smaller (or compressed) vector $m_c$ of size ($N_c$,1), with $N_c$<N. The model compression factor can be defined as k=N/$N_c$. The N-dimensional original model space must be related to the $N_c$-dimensional compressed model space. This is normally done by a linear relation (equation 2)

$$m = R m_c \qquad (2).$$

The operators R can be interpreted as an interpolation if the number of free variables in the model vector is reduced. In other words, the model m contains N values, but there are only N degrees of freedom in the N values. If k is sufficiently large, estimating the $N_c$ parameters of vector $m_c$ is much simpler than estimating the N parameters of vector m because the matrices and vectors involved in the original system of equations (1) are replaced by much smaller matrices and vectors. Once $m_c$ has been calculated, by solving a system similar to (1) but much smaller and easier to solve, m can be obtained by equation (2). Alternatively, the operators R can be interpreted as a Fourier transform. A filter can be applied after the Fourier transform to filter out high or low frequency components, thereby reducing the number of free variables as well. The parameters $m_c$ can in that case be interpreted as Fourier coefficients, and may further be interpreted as low frequency coefficients.

However, the parameter vector $m_c$ obtained by compression contains obviously less details than the parameter vector directly estimated by solving the original system (1). The model output is an interpolated version of a low-dimensional parameter vector.

Typically, this looks like a low-resolution version of the ideal solution of the system of equations (1).

The method disclosed herein benefits from the large decrease of memory requirements and numerical operations allowed by model compression techniques, but with a much higher resolution. The method works for both linear inversion, even when a single iteration is performed, and non-linear inversion. For iterative non-linear inversion the invention works even when a small number of iterations is performed.

The inventors have appreciated that all the inverse problems described above, which seek to calculate a vector m or a model update αm can be split into a set of L much smaller problems with solutions $m_i$, i=1,L or $α_i m_i$, i=1,L. Each of these solutions represents a low-resolution version $R_i m_i$ (or $R_i α_i m_i$) of the solution m (or αm) of the original problem. However, one may obtain a solution with much better resolution by stacking the L low-resolution solutions:

$$\hat{m} = \frac{1}{L} \sum_{i=1}^{L} w_i R_i m_i, \qquad (3)$$

or alternatively $$\hat{m} = \frac{1}{L} \sum_{i=1}^{L} w_i R_i α_i m_i, \qquad (4)$$

where $w_i$ represent weight factors that can be different from 1 when desirable. The weights may be predefined or solved for by, for example, a line search technique.

After solving the smaller inverse problems and combining the solutions, a vector of dimension N can be constructed like for the full problem. While the full problem cannot be inverted for many real datasets, the reduced problems can be inverted. The final solution has a better resolution than the individual components $R_i m_i$.

The L smaller compressed problems do not need to have all the same compression factor and the coarse cells can have different shapes and sizes for the different models. The operators $R_i$ may each be different. The grid may be varied at random or in a systematic way. The cells of the grid may also be shaped such that they follow known geological structures, such as seismic horizons. In cases where the Fourier transform is used, Fourier coefficients $m_i$ can be chosen such at each calculation corresponds to a slightly different part of the spectrum and whereby the combination of solutions covers the entire spectrum of relevant frequencies.

If the interpolation R is done between nodes, these nodes need not to be placed in a rectangular and regular pattern. The distance between neighbouring nodes may, for instance, vary with depth, or it may follow some known structure, or be constrained on the solution of another inversion problem in the same area. For example, the inversion problem may be a CSEM inversion problem and the grid could be chosen to follow seismic horizons which are known from prior estimations.

The set of smaller compressed problems does not need to be the same at each iteration (if an iterative estimation method is used), the number and type of smaller problems can vary during the iteration process. For instance, one may use smaller compression factors and a smaller number L of compressed problems as the iterations go if this is judged adequate for the particular problem to solve The accompanying figures illustrate different possible choices for the set of smaller problems. The illustration is strongly simplified to make the points easier to understand. The models are defined on a two-dimensional rectangular grid. The operators $R_i$ are simple nearest neighbour interpolators defined on regularly spaced nodes. This means that the vectors $R_i m_i$ have constant values inside coarse rectangular cells, the nodes being located at the center of the coarse cells. The number of cells of the fine grid (representing m) contained in the coarse rectangular cells gives a good approximation of the compression factor k. All cells have the same size and shape, for all the L compressed inversion problems, except on the edges of the grid. The factors $w_i$ and $α_i$ are supposed to be equal to 1. The invention is of course not limited to these particular simplified cases.

Figure 2:
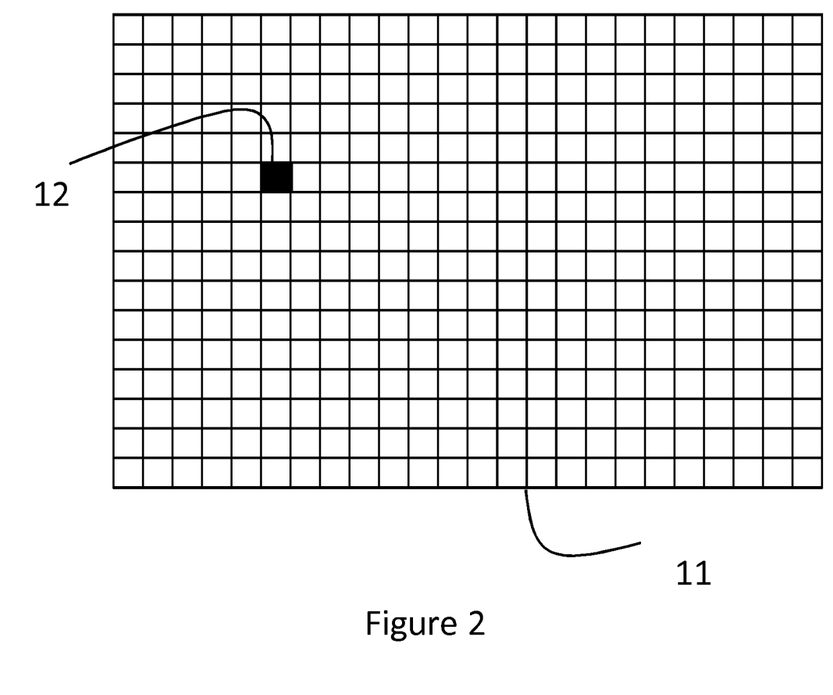
FIG. 2 illustrates schematically a data set used in the method.

Instead of a particular geophysical problem, the method is illustrated with a much simpler problem. FIG. 2 illustrates a grid 11 on which a formation is defined with an anomaly 12. We assume that the correct model vector to estimate, such as the resistivity, has equal constant values across the grid 11 except in one particular cell 12 in which it has a higher value.

Figure 3:
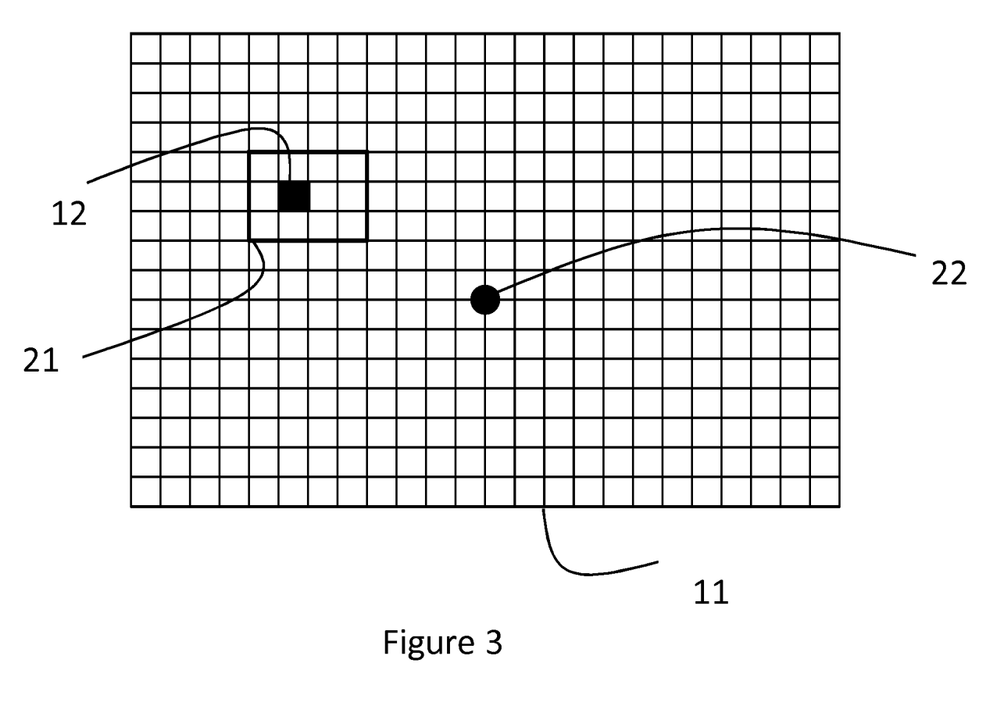
FIG. 3 illustrates schematically a partial solution of the method.

FIG. 3 shows the grid 11 with anomaly 12 together with a solution on a coarse grid. The solution is illustrated as rectangle 21 and within rectangle 21 the solution has a constant value which is higher than the surrounding value across the rest of the coarse grid. The anomaly 12 is located within rectangle 21 and the solution has correctly identified the location of the anomaly, except that the resolution is much lower. The compression factor is 3 in the vertical direction and 4 in the horizontal direction, so 12 in total. A reference point 22 is shown for the coarse grid.

Figure 4:
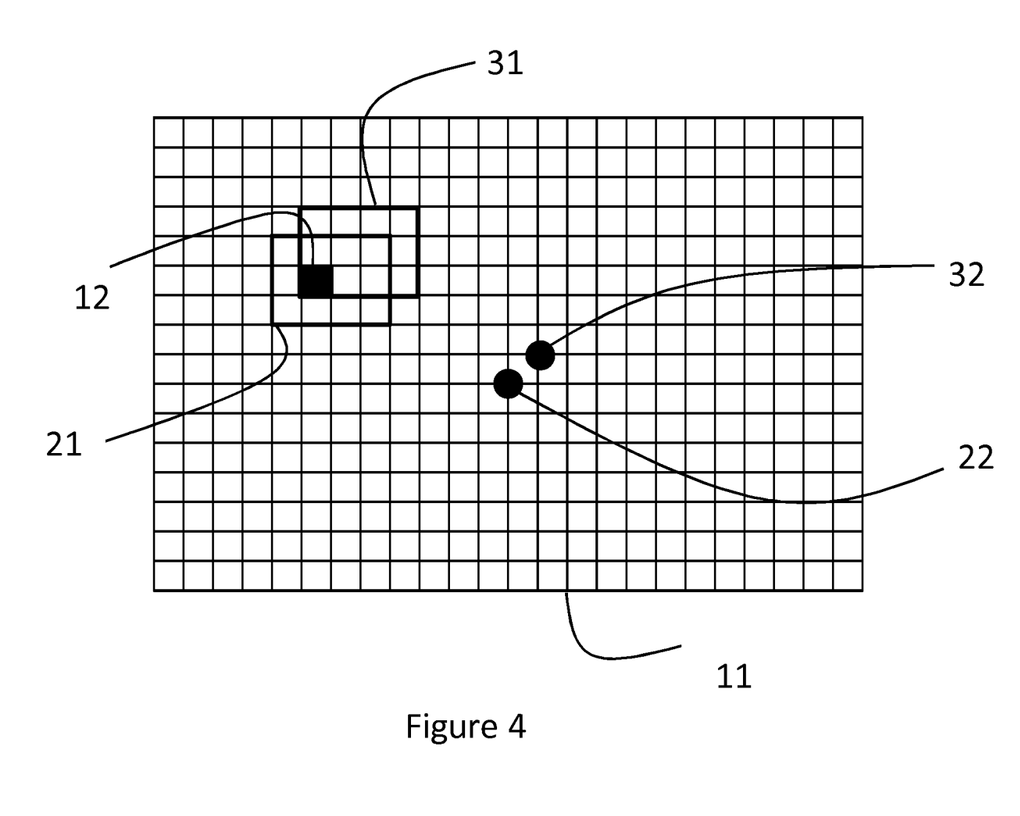
FIG. 4 illustrates schematically two partial solutions of the method.

FIG. 4 shows the features of FIG. 2 and additionally a second solution of a second coarse grid which has been shifted in the horizontal and vertical direction. The shift is illustrated by reference point 32 which is shifted one cell to the right and one cell upwards with respect to reference point 22, using the coordinates of the fine grid. The second solution 31 is also shifted to the right and upwards. Again, the anomaly has correctly been identified, but with a lower resolution.

Figure 5:
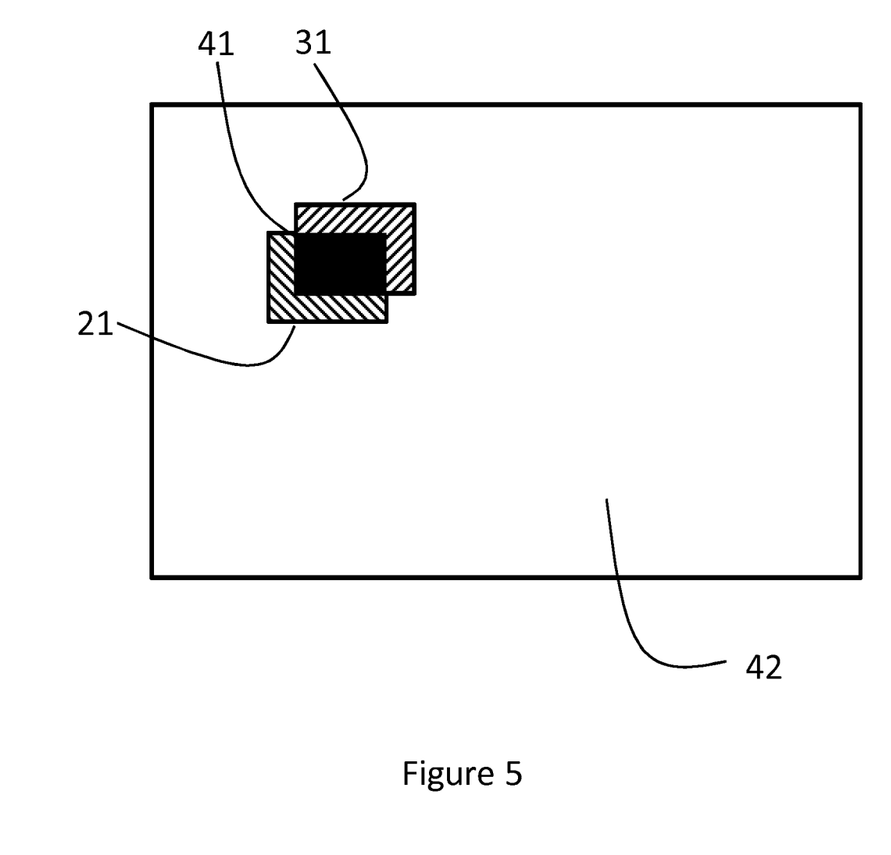
FIG. 5 illustrates schematically the combinations of solutions used in the method.

FIG. 5 illustrates the sum of the two solutions. The solutions have a constant value 42 outside the anomalies, except for a higher value in regions 21 and 31. The region of overlap 41 has the combined value of regions 21 and 31. The size of this region of overlap 41 is smaller than regions 21 and 31, so the resolution is increased although the resolution is still lower than the grid of FIG. 1. It is clear that the combination of many solutions will start approximating the anomaly of FIG. 1 accurately, but without the computational cost of the full model.

The methods described herein by way of example concern non-linear inversion of CSEM data, but the claimed invention can also be applied to other methods. For example, non-linear inversion of other types of geophysical data, like magnetotelluric data, seismic data, acoustic data acquired in boreholes and Ground Penetrating Radar data. For seismic data, an application of the invention is to so-called Full Waveform Inversion. The method can also be applied to joint-inversions where several types of data are used simultaneously.

Some common earth properties that can be inverted from geophysical data are inverted for include acoustic velocity, formation and fluid densities, acoustic impedance, Poisson's ratio, formation compressibility, shear rigidity, porosity, and fluid saturation.

Deterministic inversion methods are based on comparison of the output from an earth model with the observed field data and continuously updating the earth model parameters to minimize a function, which is usually some form of difference between model output and field observation. The set of model parameters that minimizes the objective function will produce a numerical seismogram which best compares with collected field seismic data. The step of updating is also carried out on a grid which can be varied between iterations. Stochastic inversion methods can also be used to generate constrained models as used in reservoir flow simulation, using geostatistical tools like kriging. As opposed to deterministic inversion methods, which produce a single set of model parameters, stochastic methods generate a suite of alternate earth model parameters which all obey the model constraint.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A computer-implemented method of estimating a physical parameter of a subsurface of the Earth by solving a geophysical inverse problem using a set of measured geophysical data and simulations of the set of measured geophysical data, wherein the simulations are dependent on a model vector representing the physical parameter, the method comprising:
   providing a model vector representing the physical parameter,
   transforming the model vector by a first operator to provide a first transformed model vector, wherein transforming the model vector by the first operator comprises reducing a number of free parameters in the inverse problem according to a first compression factor,
   solving the inverse problem for the first transformed model vector to provide a first solution,
   transforming the same model vector by a second operator to produce a second transformed model vector, wherein the step of transforming the model vector by the second operator comprises reducing a number of free parameters according to a second compression factor,
   solving the inverse problem for the second transformed model vector to provide a second solution,
   calculating a weighted sum of the first solution and the second solution,
   providing an estimation of the physical parameter based on the calculated weighted sum of the first solution and the second solution, wherein the weighted sum of the first solution and the second solution minimizes a distance between the set of measured geophysical data and the simulation of the set of measured geophysical data,
   determining a presence of hydrocarbons or water using the estimation of the physical parameter, and
   exploring hydrocarbons or water in the subsurface of the Earth based on the determined presence of hydrocarbons or water.

2. The computer-implemented method of claim 1, wherein the physical parameter is a conductivity of the subsurface of the Earth.

3. The computer-implemented method according to claim 1, wherein transforming the model vector by a first operator comprises applying a first Fourier transform to the model vector and wherein transforming the model vector by a second operator comprises applying a second Fourier transform to the model vector.

4. The computer-implemented method according to claim 3, wherein transforming the model vector by the first operator or the second operator further comprises applying a filter.

5. The computer-implemented method according to claim 1, wherein reducing the number of free parameters in the inverse problem comprises interpolating the model vector defined on a fine grid to provide the first transformed model vector defined on a first coarse grid, wherein the resolution of the first coarse grid is lower than the resolution of the fine grid, and interpolating the model vector defined on a fine grid to provide the second transformed model vector defined on a second coarse grid, wherein the resolution of the second coarse grid is lower than the resolution of the fine grid.

6. The computer-implemented method according to claim 5, wherein the coarse grid is uniform or non-uniform.

7. The computer-implemented method according to claim 5, wherein the coarse grid depends on prior knowledge of the physical structure of a formation.

8. The computer-implemented method of claim 5, wherein the first coarse grid is shifted with respect to the second coarse grid.

9. The computer-implemented method according to claim 1, wherein the set of measured geophysical data are one of: a set of seismic, electric, magnetic or gravimetric measurements.

10. The computer-implemented method according to claim 1, wherein the model vector comprises a model update in an iterative inversion method.

11. The computer-implemented method of claim 10, wherein the minimal distance is estimated with a line search.

12. The computer-implemented method of claim 1, wherein in the inversion problem is a linear or a non-linear inversion problem.

13. A computer system arranged to carry out the method of claim 1.

14. Computer software installed on a non-transitory computer readable medium of a computer system and arranged to cause the computer system to carry out the method of claim 1.

15. The computer-implemented method of claim 1, further comprising the step of constructing a 3D model of the subsurface of the Earth using the estimation of the physical parameter.

16. A computer-implemented method, comprising:
estimating a physical parameter of a subsurface of the Earth by solving a geophysical inverse problem using a set of measured geophysical data and simulations of the set of measured geophysical data, wherein the simulations are dependent on a model vector representing the physical parameter, comprising:
providing a model vector representing a physical parameter of a subsurface of the Earth;
transforming the model vector by a first operator to provide a first transformed model vector by reducing a number of free parameters in an inverse problem according to a first compression factor;
solving the inverse problem for the first transformed model vector to provide a first solution;
transforming the same model vector by a second operator to produce a second transformed model vector by reducing the number of free parameters according to a second compression factor;
solving the inverse problem for the second transformed model vector to provide a second solution,
calculating a weighted sum of the first solution and the second solution, and
providing an estimation of the physical parameter based on the calculated weighted sum of the first solution and the second solution, wherein the weighted sum of the first solution and the second solution minimizes a distance between the set of measured geophysical data and the simulation of the set of measured geophysical data;
determining a presence of hydrocarbons or water using the estimation of the physical parameter; and
exploring hydrocarbons or water in the subsurface of the Earth based on the determined presence of hydrocarbons or water,
wherein the set of measured geophysical data are one of: a set of seismic, electric, magnetic or gravimetric measurements.

17. The computer-implemented method of claim 16, further comprising the step of constructing a 3D model of the subsurface of the Earth using the estimation of the physical parameter.

18. A computer-implemented method, comprising:
acquiring a set of geophysical data from a subsurface of the Earth;
estimating a physical parameter of the subsurface of the Earth by solving a geophysical inverse problem using the set of measured geophysical data and simulations of the set of measured geophysical data, wherein the simulations are dependent on a model vector representing the physical parameter, comprising:
providing a model vector representing a physical parameter of a subsurface of the Earth;
transforming the model vector by a first operator to provide a first transformed model vector by reducing a number of free parameters in an inverse problem according to a first compression factor;
solving the inverse problem for the first transformed model vector to provide a first solution;
transforming the same model vector by a second operator to produce a second transformed model vector by reducing the number of free parameters according to a second compression factor;
solving the inverse problem for the second transformed model vector to provide a second solution,
calculating a weighted sum of the first solution and the second solution, and
providing an estimation of the physical parameter based on the calculated weighted sum of the first solution and the second solution, wherein the weighted sum of the first solution and the second solution minimizes a distance between the set of measured geophysical data and the simulation of the set of measured geophysical data,
wherein reducing the number of free parameters in the inverse problem comprises interpolating the model vector defined on a fine grid to provide the first transformed model vector defined on a first coarse grid, wherein the resolution of the first coarse grid is lower than the resolution of the fine grid, and interpolating the model vector defined on a fine grid to provide the second transformed model vector defined on a second coarse grid, wherein the resolution of the second coarse grid is lower than the resolution of the fine grid, wherein the first coarse grid is shifted with respect to the second coarse grid, and
wherein the coarse grid depends on prior knowledge of the physical structure of a formation;
performing a simulation of the subsurface of the Earth and constructing a 3D model of the subsurface of the Earth using the estimation of the physical parameter, wherein the estimation of the physical parameter optimizes agreement between simulated geophysical data and the geophysical data, thereby achieving an optimal 3D model of the subsurface of the Earth;
determining a presence of hydrocarbons or water using the optimal 3D model, and/or the estimation of the physical parameter; and
exploring hydrocarbons or water in the subsurface of the Earth based on the determined presence of hydrocarbons or water,
wherein the set of measured geophysical data are one of: a set of seismic, electric, magnetic or gravimetric measurements.

* * * * *